United States Patent
Drosdak

Patent Number: 5,469,652
Date of Patent: Nov. 28, 1995

[54] FISHING LEADER AND CONNECTOR

[76] Inventor: Joseph Drosdak, 158 W. Coal St., Nesquehoning, Pa. 18240

[21] Appl. No.: 229,563

[22] Filed: Apr. 19, 1994

[51] Int. Cl.⁶ ..................................... A01K 91/04
[52] U.S. Cl. .................. 43/44.83; 403/343; 59/95; 43/44.98
[58] Field of Search .................. 43/44.98, 44.83; 59/95; 403/182, 184, 287, 296, 343

[56] References Cited

U.S. PATENT DOCUMENTS

| | | | |
|---|---|---|---|
| 147,928 | 2/1874 | Fry | 59/95 |
| 999,914 | 8/1911 | Tolman | 403/182 |
| 1,732,581 | 10/1929 | Johnson | 403/343 |
| 1,756,973 | 5/1930 | Conner | 403/343 |
| 2,465,064 | 3/1949 | Colosimo | 43/42 |
| 2,552,248 | 5/1951 | Zavod | 287/1 |
| 3,041,695 | 7/1962 | Ouellette | 43/44.83 |
| 3,864,865 | 2/1975 | Swisher | 43/44.98 |
| 3,898,760 | 8/1975 | Klein | 43/44.83 |
| 3,924,346 | 12/1975 | Evers | 43/26.2 |
| 3,983,657 | 10/1976 | Klein | 43/44.83 |
| 4,117,574 | 10/1978 | Yoshida | 43/44.83 |
| 4,604,821 | 8/1986 | Moser | 43/44.98 |
| 4,864,767 | 9/1989 | Drosdak | 43/43.1 |

FOREIGN PATENT DOCUMENTS 611651  1/1961  Canada ............................... 43/44.83

*Primary Examiner*—Kurt Rowan
*Attorney, Agent, or Firm*—Eckert Seamans Cherin & Mellott

[57] ABSTRACT

Disclosed is a leader or line used for fishing. The leader or line, which may be a monofilament line, has a threaded portion on one end thereof that allows it to be attached to a threaded connector attached to a separate line. The leader of this invention is especially suitable for providing a quick and easy attachment or a monofilament tapered or non tapered leader to a fly line. Also disclosed is a connector that is used to connect the end of the fly line to the threaded end of the leader.

5 Claims, 1 Drawing Sheet

FISHING LEADER AND CONNECTOR

BACKGROUND OF THE INVENTION

This invention relates to a fishing leader or line used for sport fishing. It relates particularly to a leader or line useful in the sport of fly fishing or spin fishing.

In the sport of fly fishing, the angler uses a long, flexible fly rod made of bamboo, fiberglass or graphite, a fly reel to hold a floating or non-floating fly line that is attached to a tapered or non-tapered leader to which an artificial fly or insect replica is attached.

In the sport of spin fishing, the angler uses a shorter but flexible rod made of bamboo, fiberglass or graphite, an open face or closed face spinning reel to hold a monofilament or braided spinning line that is attached to an artificial lure or to live bait.

Both the fly fishing angler and the spin fishing angler have the need to join lines and leaders of similar and dissimilar materials and diameters together in order to present the fly or the lure in a manner that will attract fish. This is usually done by the angler tying the lines together with one of several knots that have been developed over the years by anglers. Many of the knots that are reliable and satisfactory for this purpose are difficult to tie in the field or are difficult to tie if the angler has poor eyesight or poor finger dexterity. In addition, these knots are usually difficult to untie and usually require the angler to cut the line in order to attach a different leader or lure.

In the sport of fly fishing, the angler usually attaches a tapered, thin monofilament or braided leader line to the end of a relatively heavy braided and coated fly line and then attaches thinner monofilament lines, called tippets, to attach the fly to the end of the leader. Both the leader line and the tippets need frequent replacement in the field as a result of breakage or change in fishing conditions.

The attachment of a thin tapered or non tapered leader line to the heavier braided and coated fly line has always been a problem since the connection between the fly line and the leader must be smooth to reduce wind resistance and to pass through the guides and ferrules of the fly rod. In the past this connection has been accomplished with special knots, special splices, end loops, adhesives and special mechanical connectors. One such connector disclosed in U.S. Pat. No. 4,604,821 issued in 1986 to Moser is a tube of braided fibers which fits on the end of the fly line and the end of the leader and operates like a Chinese finger trap that when elongated under tension, tightens its grip on the ends of the two lines.

As indicated above, all anglers, and especially fly fisherman have the need to make simple and frequent changes of leaders in the field to accommodate breakages and changes in the fishing conditions. It is quite common to need to change from a long leader to a shorter leader because of a sudden change in wind conditions or in the character of the stream or the type of fly or lure being fished. It is also common for an angler to change from a "sinking" type of leader to a "floating" type of leader to adapt to sudden changes in the fishing environment.

SUMMARY OF THE INVENTION

It is therefore an object of this invention to provide a new and improved fishing line or leader that allows it to be easily attached to a separate fishing line, especially one of a different diameter.

It is another object of this invention to provide a new and improved monofilament fishing line, especially suitable for use as a leader for the sport of fly and spin fishing that does not require the angler to tie special knots.

It is still another object of this invention to provide a new and improved fishing line or leader that can be easily attached to or detached from another line under field conditions.

It is a further object of this invention to provide a new and improved fishing line or leader that can be easily manufactured and used with existing fishing tackle and lures.

It has been discovered that the foregoing objects can be attained by a monofilament line having a thread formed integrally on at least one end thereof which allows the threaded end to be easily and quickly threaded into a matching threaded female end or a fitting or connector attached to the end of another line.

DESCRIPTION OF THE PREFERRED EMBODIMENTS

Figure 1:
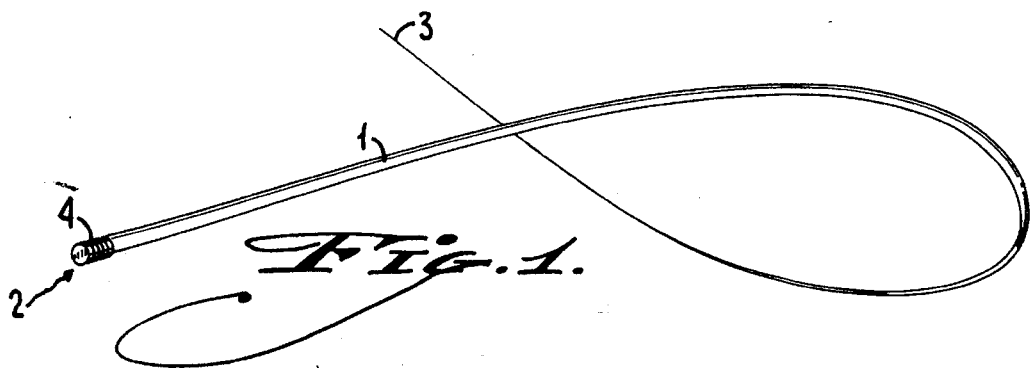
FIG. 1 is an isometric view of a one embodiment of the monofilament tapered leader of this invention.

FIG. 1 is an isometric view of one embodiment of a monofilament tapered leader or line of this invention. As shown in FIG. 1, leader 1 is comprised of a single strand of a flexible polymer, such as nylon, having a butt end 2 of a diameter larger than the tip end 3. The butt end 2 has a short integral threaded portion 4. Typical leaders 1, as illustrated in FIG. 1, used for fresh water fly fishing, will be of a length of about 7 to 9 feet in length and will have a butt end 2 diameter of about 0.019 to 0.09 inches and gradually taper to a tip end diameter of about 0.005 to 0.015 inches. Typical leaders 1 used for salt water fly fishing may be somewhat larger in diameter than those used for fresh water fly fishing.

The short integral threaded portion 4 is formed by either machining with a die or rolling a standard coarse or fine thread into the butt end 2 of the monofilament polymer leader or line. The thread should be long enough to provide a good connection but also allow the butt end 2 to be attached or detached from the fly line without tools, using only the fingers of the angler.

Figure 2:
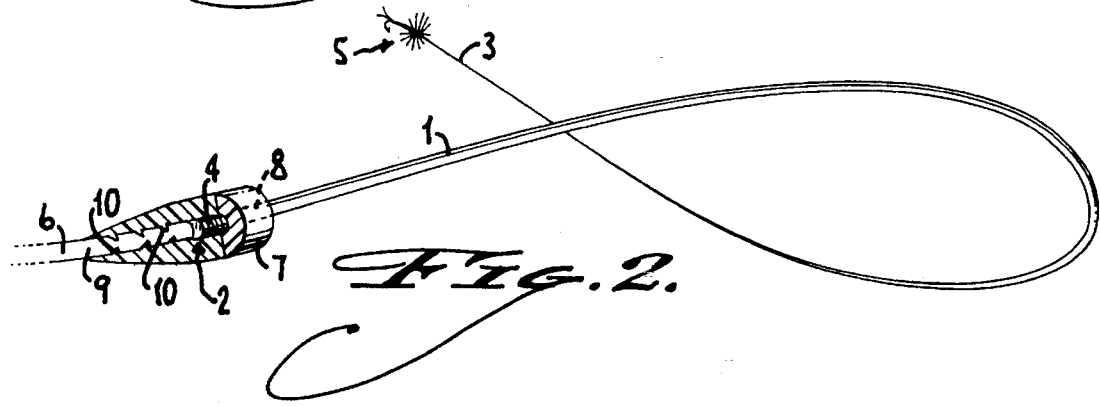
FIG. 2 is an isometric view, partly in section, of a monofilament tapered leader of this invention attached to a fly and to the end of a fly line using a preferred embodiment of a suitable connector.

FIG. 2 is an isometric view, partly in section of a monofilament tapered leader 1 of this invention attached to a fly 5 and to end of a braided and coated fly line 6 using a preferred embodiment of a suitable connector 7. As shown in FIG. 2, the threaded portion 4 of the butt end 2 of the leader 1 is threaded into a mating threaded female socket 8 formed in one end of the connector 7. The end of the braided and coated fly line 6 fits into a socket 9 in the other end of the connector 7 which is provided with teeth or barbs 10 which are clamped tightly around the periphery of the end of the braided and coated fly line 6. The teeth or barbs 10 may be similar to those disclosed in my prior U.S. Pat. No. 4,864,767 issued Sep. 12, 1989 for "Fishing Line Jaw-Type Connector.

The connector 7 is made of metal or plastic and, as shown in FIG. 2, is of a diameter only slightly larger than that of the fly line 6. As shown in FIG. 2, the connector 7 will allow the threaded portion 4 of the butt end of the leader 1 to be quickly and easily attached or detached by the angler from the end of the fly line 6. While I have illustrated a preferred embodiment of a connector 7 (enlarged for clarity), other shapes and styles of connectors could be used so long as they have a female threaded socket to receive the threaded butt end portion 4 of the leader line 1 to be attached.

Figure 3:
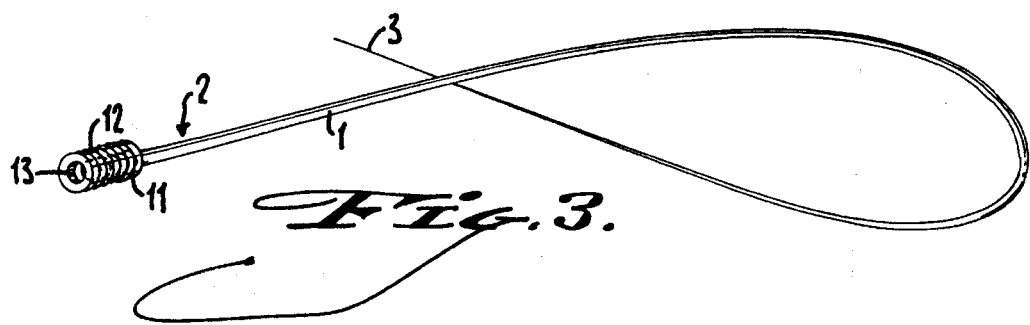
FIG. 3 is an isometric view of a second embodiment of a monofilament tapered leader of this invention.

FIG. 3 is an isometric view of a second embodiment of a monofilament leader 1 of this invention. In this embodiment, the threaded portion 4 is a separate sleeve 11 of nylon or other suitable polymer or a metal having external threads 12 and a central bore 13 to receive a smooth or irregular butt end 2 of the leader 1. The sleeve 11 is then permanently attached to the butt end 2 of the leader with a suitable adhesive or glue or by a heat bonding technique, well known in the art.

Figure 4:
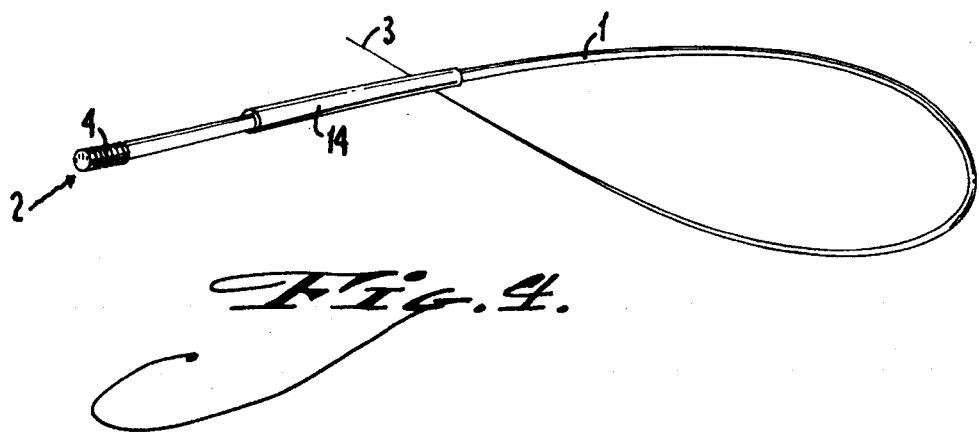
FIG. 4 is an isometric view of a third embodiment of a monofilament tapered leader of this invention.

FIG. 4 is an isometric view of a third embodiment of a monofilament leader 1 of this invention in which a portion of the leader between the butt end 2 and the tip end 3 is provided with a weighted portion 14 which will cause the leader to sink in the water.

While I have illustrated, as preferred embodiments, a monofilament polymer material for the leader line 2, this invention could also be easily adapted to braided leader lines or to metal leader lines that are used by anglers for special fishing conditions.

While I have illustrated preferred embodiments of this invention for the sport of fly fishing for which it is ideally suited, the line and leader of this invention could be easily adapted for use with open or closed face spinning tackle and lines to enable a spin angler to also quickly and easily change leaders and lures in the field.

It will also be understood that the embodiments of this invention that have been illustrated and described are provided for describing this invention and not for purposes of limitation.

I claim:

1. The combination of a fly line, a leader line and a connector, the connector having means formed in one end for attachment of an end of the fly line, and a female threaded socket formed in the other end for receiving a thread formed integrally on at least one end of the leader line.

2. The combination of claim 1 in which the leader is tapered and the thread is formed on a butt end.

3. The combination of claim 1 in which the leader is a monofilament line.

4. The combination of claim 1 in which the leader is made of a polymer.

5. The combination of claim 1 in which the means formed in said one end of the connector for attachment of the end of the fly line comprises a female socket having barbs which clamp around the periphery of the fly line.

* * * * *